United States Patent [19]
Daoud

[11] Patent Number: 5,868,362
[45] Date of Patent: Feb. 9, 1999

[54] LATCHING MECHANISM FOR BACK-TO-BACK MOUNTING

[75] Inventor: Bassel H. Daoud, Parsippany, N.J.

[73] Assignee: Lucent Technologies Inc., Murray Hill, N.J.

[21] Appl. No.: 924,712

[22] Filed: Aug. 29, 1997

[51] Int. Cl.$^6$ .................................................. F16B 15/00
[52] U.S. Cl. ............................................. 248/71; 248/68.1
[58] Field of Search .............................. 248/71, 73, 74.1, 248/65, 74.2, 74.3, 68.1

[56] References Cited

U.S. PATENT DOCUMENTS

| | | | |
|---|---|---|---|
| 2,397,680 | 4/1946 | Morehouse | 248/73 |
| 3,154,281 | 10/1964 | Frank | 248/71 X |
| 3,253,084 | 5/1966 | Taylor | 248/73 X |
| 4,564,163 | 1/1986 | Barnett | 248/71 |
| 4,669,688 | 6/1987 | Itoh et al. | 248/71 X |
| 4,989,822 | 2/1991 | Fannon | 248/71 X |

*Primary Examiner*—Ramon O. Ramirez

[57] ABSTRACT

Two devices having a latching mechanism of the present invention can be mounted back to back within a single mounting hole in a mounting surface. Each latching mechanism has two or more prongs designed such that they do not interfere with the prongs of another device mounted within the same mounting hole from the opposite side of the mounting surface. In one embodiment, the present invention can be implemented as a retainer for retaining wires, cables, and cables for telecommunications applications. In a preferred embodiment, each retainer prevents access from its side of the mounting surface to the other retainer mounted from the other side of the mounting surface. As such, the present invention provides a security feature for the assembly.

11 Claims, 8 Drawing Sheets

LATCHING MECHANISM FOR BACK-TO-BACK MOUNTING

BACKGROUND OF THE INVENTION

1. Field of the Invention

The present invention relates to latching mechanisms for mounting devices within mounting holes, and, in particular, to latching mechanisms for retainers for organizing bundles of wires, fibers, and cables for telecommunications applications.

2. Description of the Related Art

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure would typically be mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents.

Depending on the situation, it may be desirable to control the access that different users have to the different types of hardware housed in a BEP enclosure. For example, when a BEP enclosure is to be used in an office building, it may be desirable to provide operators of the office building with access to the connection hardware housed in the BEP enclosure, but not to the isolation hardware. In this way, the office-building operators would be able to adjust the distribution of telephone signals from the cable to the various offices in the building, while, at the same time, being prevented from disturbing the electrical isolation hardware housed in the BEP enclosure.

To achieve this access control, BEP enclosures typically have two or more chambers that house the different types of hardware. For example, isolation components may be housed in a first chamber, and connection components, in a second chamber. The BEP enclosure can then be configured to provide only limited access to the office-building operators, that is, access to the second chamber but not to the first chamber. Representatives of the telephone service company, on the other hand, would have access to both chambers.

Figure 1A:
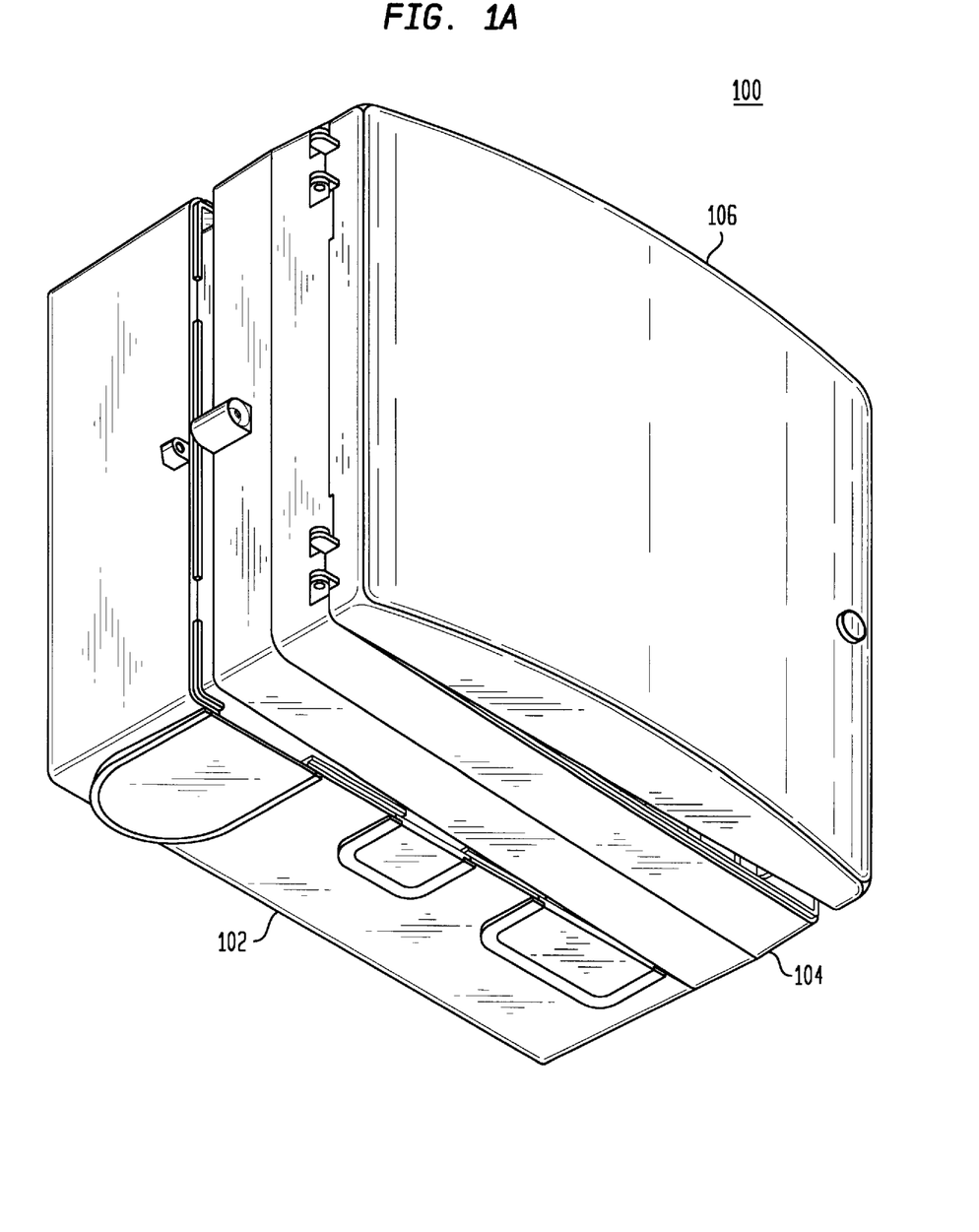
FIGS. 1(a)–(b) show perspective and cross-sectional views of a typical BEP enclosure.
Figure 1B:
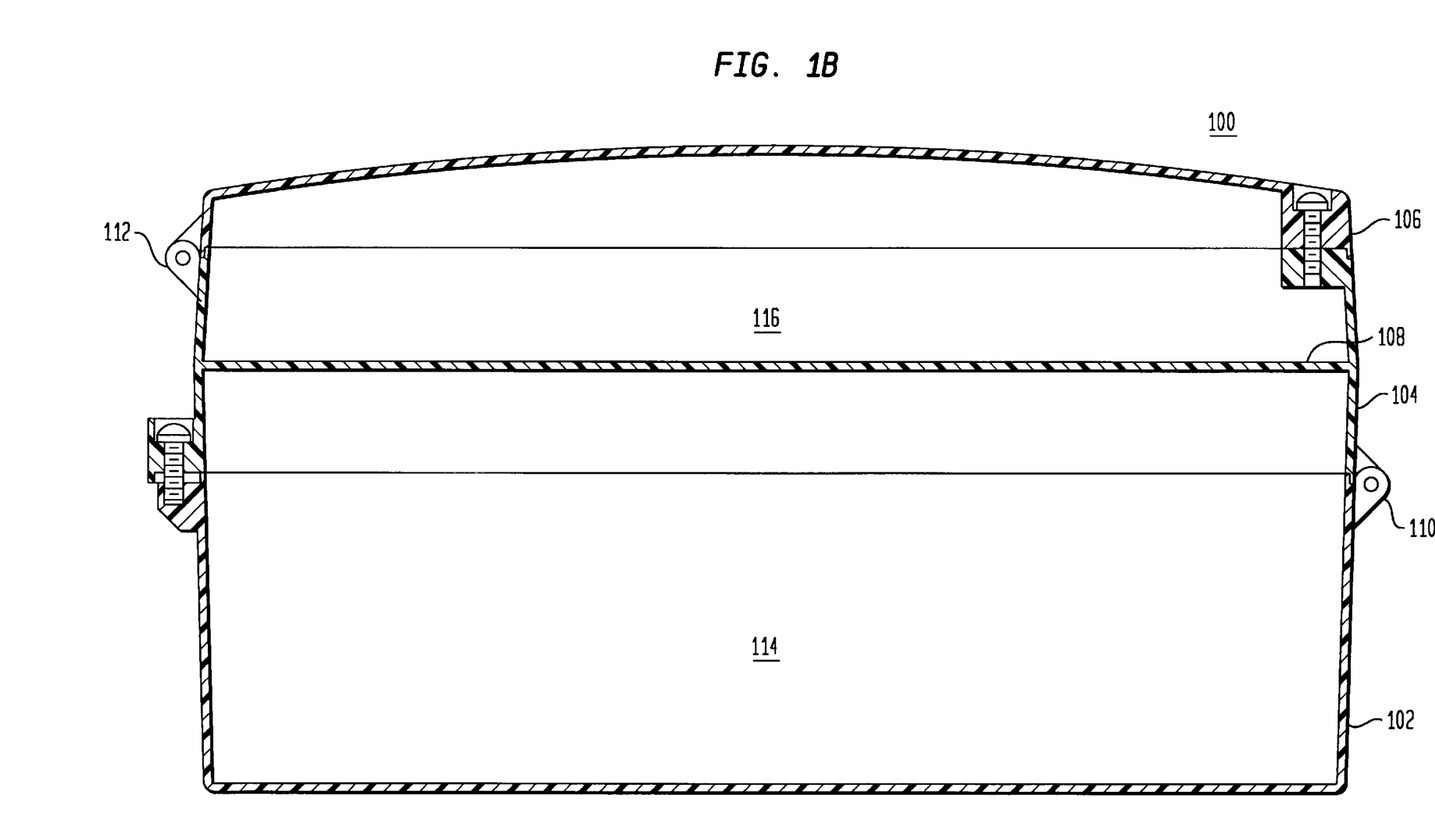

FIGS. 1(a) and 1(b) show perspective and cross-sectional views, respectively, of the three basic parts of a typical BEP enclosure 100: the base 102, the mid layer 104, and the cover 106. The base is essentially a rectilinear box with a bottom, four side walls, and open on its top. The mid layer has four side walls with a mounting plane 108 perpendicular to the four side walls. The mid layer is adapted to be pivotally connected to the base at one side (110), and the cover is adapted to be pivotally connected to the mid layer at the other side (112). The interior of the base and the lower portion of the mid layer form an inner chamber 114 of the BEP enclosure, while the upper portion of the mid layer and the cover form an outer chamber 116 of the BEP enclosure. As such, the mounting plane of the mid layer forms both the top surface of the inner chamber and the bottom surface of the outer chamber.

Chamber access is typically controlled by the type of mechanism used to hold together the parts that form the chamber. For example, special screws can be used to seal a chamber thereby restricting access to only those individuals who have special tools designed to remove those special screws. Two such screws are KS-type screws and 216-type screws, which require special tools to remove. If a regular slotted or Philips-head screw is used to secure the chamber, then access will not be restricted because regular and Philips-head screw drivers are readily available.

In a typical BEP-enclosure application, isolation components are housed in the inner chamber, while connection components are housed in the outer chamber. In that case, each chamber will hold bundles of copper wires (e.g, twisted pairs), optical fibers, or coaxial cables, corresponding to the different signals carried by the telecommunications cable. In particular, one or more bundles leading from the cable to the isolation components will be housed within the inner chamber, while one or more bundles leading from the connection components to the local network will be housed within the outer chamber. It is desirable to gather these bundles within retainers mounted in the chambers in order to maintain an orderly arrangement of the bundles within the chambers.

SUMMARY OF THE INVENTION

The present invention is directed to latching mechanisms for such devices as retainers for bundles of wires, fibers, and cables, used, for example, in telecommunications applications. The latching mechanisms are designed such that two of the devices can be mounted back to back on opposite sides of a mounting surface within the same hole in the mounting surface. When used with retainers, the present invention provides bundle retention capabilities on both sides of the mounting surface. At the same time, each retainer prevents access from its side to the retainer mounted on the other side. In this way, the present invention performs a security function for the assembly.

According to one embodiment of the present invention, a device comprises a latching mechanism adapted to mount the device within a mounting hole in a mounting surface, wherein two such devices are adapted to be mounted back to back within a single mounting hole.

BRIEF DESCRIPTION OF THE DRAWINGS

Other aspects, features, and advantages of the present invention will become more fully apparent from the follow tiled description, the appended claims, and the accompanying drawings in which:

DETAILED DESCRIPTION

Figure 2:
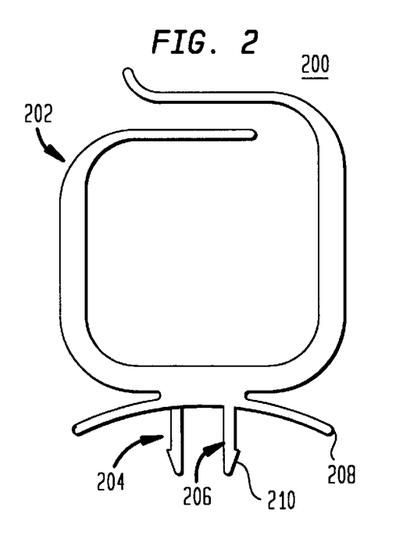
FIG. 2 shows a side view of a retainer, according to one embodiment of the present invention.

FIG. 2 shows a side view of a retainer 200, according to one embodiment of the present invention. Retainer 200 has loop arrangement 202 and latching mechanism 204. Loop arrangement 202 is designed to retain one or more wires, fibers, and/or cables used to carry telecommunications signals, and latching mechanism 204 is designed to mount retainer 200 within a mounting hole in a mounting surface. In particular, latching mechanism 204 has two prongs 206 and two flanges 208, each prong 206 having a barb 210.

Figure 3:
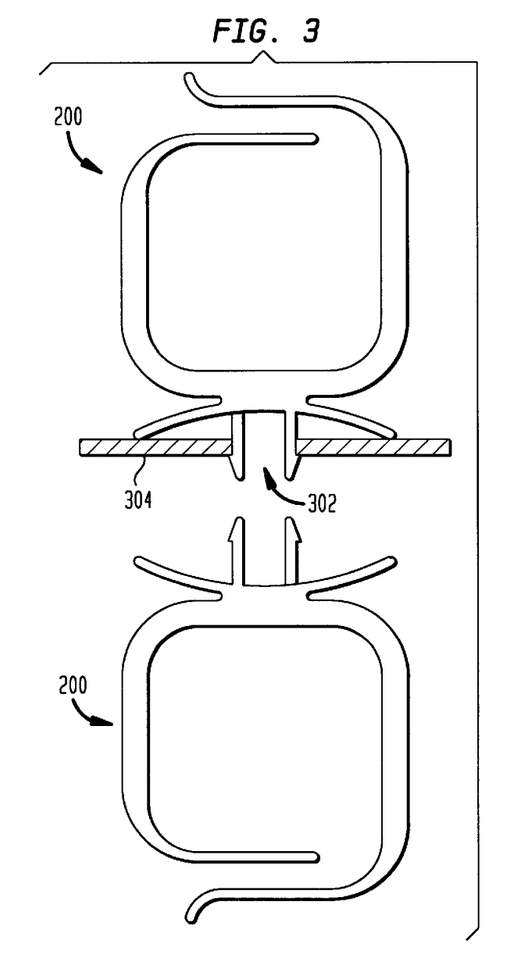
FIG. 3 shows a side view of the retainer of FIG. 2 mounted within a mounting hole of a mounting surface, shown in cross section, and a second retainer positioned for mounting within the same mounting hole.

FIG. 3 shows a side view of a first retainer 200 of FIG. 2 mounted within a mounting hole 302 of a mounting surface 304, shown in cross section in FIG. 3. Retainer 200 is mounted onto mounting surface 304 by inserting the prongs 206 of the latching mechanism 204 within hole 302. Retainer 200 is held in place by the opposing forces applied to the mounting surface 304 by flanges 208 and barbs 210. Retainer 200 can be removed from hole 302 by slightly squeezing together the semi-rigid prongs 206 to free the barbs 210 from the mounting surface 304.

As shown in FIG. 3, a second retainer, having the same design as retainer 200, is positioned for mounting on the other side of mounting surface 304 within the same mounting hole 302. The second retainer is rotated about the page normal by 180 degrees with respect to the first retainer.

Figure 4:
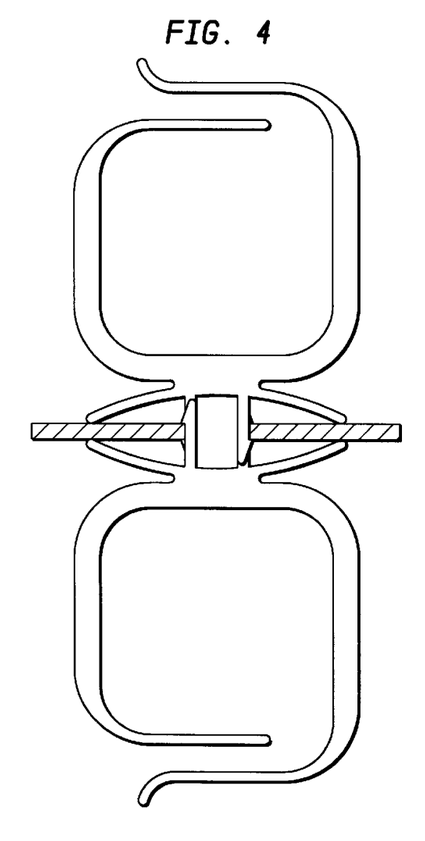
FIG. 4 shows a side view of the two retainers of FIG. 3 mounted back to back within the same hole of the mounting surface.

FIG. 4 shows a side view of the two retainers of FIG. 3 mounted back to back within the same hole of the mounting surface.

Figure 5A:
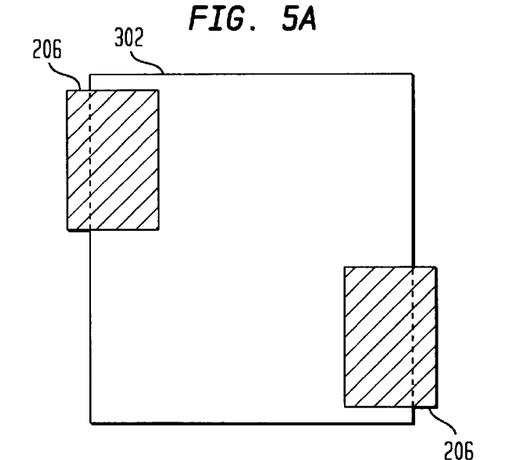
FIG. 5(a)–(c) show end views of the prongs of the retainers of FIGS. 2–4, as seen from the opposite side of the mounting hole.
Figure 5B:
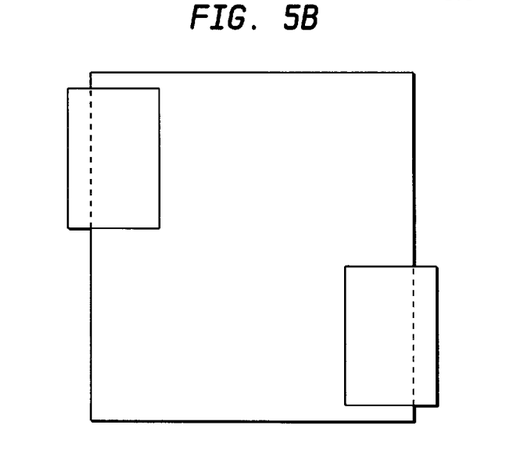
Figure 5C:
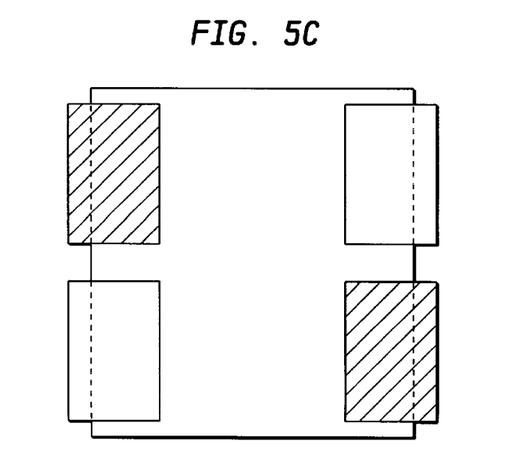

FIGS. 5(a)–(c) show end views of the prongs of the retainers of FIGS. 2–4, as seen from the opposite side of the mounting hole. FIG. 5(a) shows the prongs (with shading) of the first retainer, FIG. 5(b) shows the prongs (in outline) of the second retainer, and FIG. 5(c) shows a composite of FIGS. 5(a) and 5(b). As shown in FIG. 5(a), each of the two prongs 206 has a height that is slightly less than half of the length of the sides of the mounting hole. Furthermore, the two prongs are positioned on opposite halves of opposing sides of the mounting hole. With such a configuration, the second retainer having the same design as the first retainer can be inserted into the same mounting hole, but from the other side of the mounting surface, as shown in FIG. 4. This is due to the relative positions of the prongs, as shown in FIG. 5(c).

When two retainers are mounted back to back in the same mounting hole of a mounting surface, such as is shown in FIG. 4, each retainer acts as a cover for the other retainer, thereby preventing access to the other retainer from its corresponding side of the mounting surface. As such, when used in a BEP enclosure, such as the enclosure of FIG. 1, retainers of the present invention will provide bundle retention capabilities on both sides of the mounting plane that defines both the top of the inner chamber and the bottom of the outer chamber.

Figure 6A:
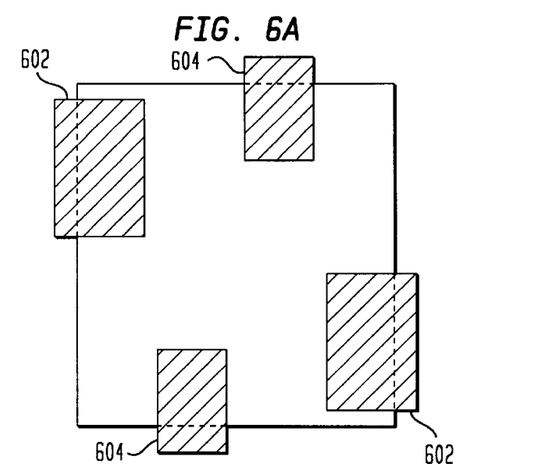
FIGS. 6(a)–(c) show end views of the prongs of retainers, according to an alternative embodiment of the present invention.
Figure 6B:
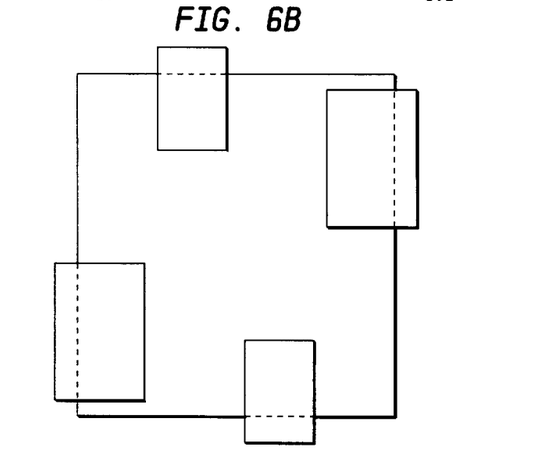
Figure 6C:
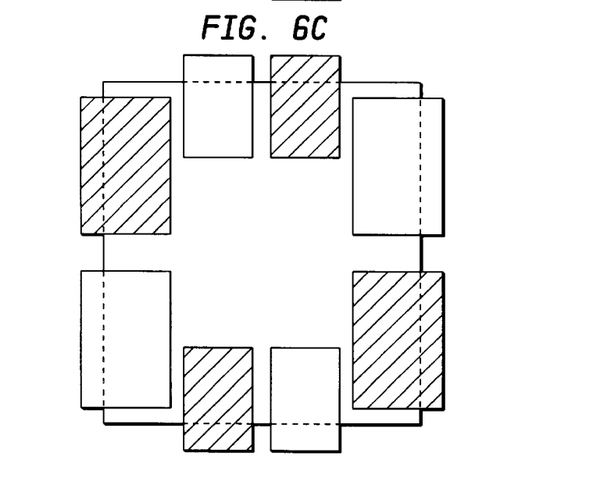

FIGS. 6(a)–(c) show end views of the prongs of retainers, according to an alternative embodiment of the present invention. FIG. 6(a) shows the prongs (with shading) of a first retainer, FIG. 6(b) shows the prongs (in outline) of a second retainer rotated 180 degrees about the page normal with respect to the first retainer, and FIG. 6(c) shows a composite of FIGS. 6(a) and 6(b). According to this embodiment, the latching mechanism of each retainer comprises two large prongs 602 and two small prongs 604. The small prongs 604 increases the strength of the mounting provided by the retainer as opposed to the design of retainer 200 of FIG. 2, which has only two large prongs 206.

Figure 7:
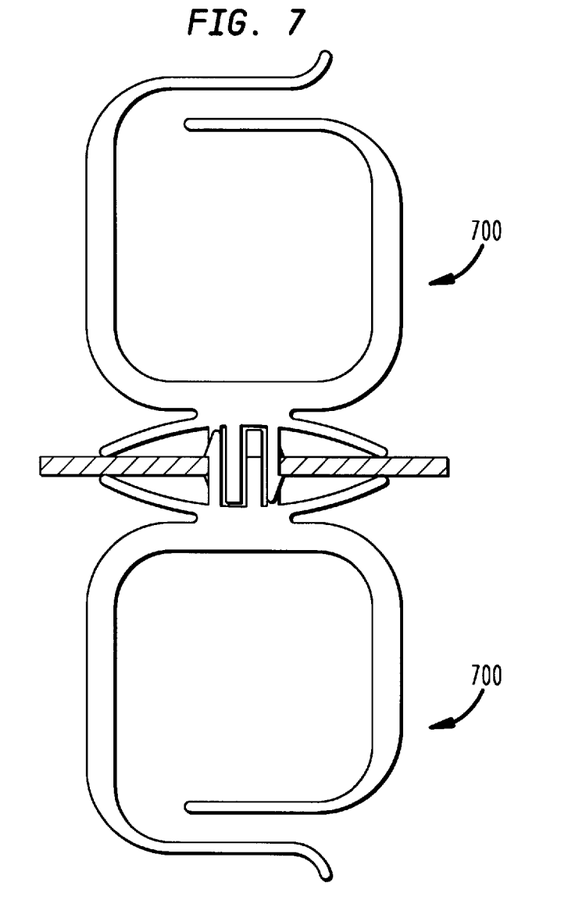
FIG. 7 shows aside view of two retainers mounted within the same mounting hole of a mounting surface.

FIG. 7 shows a side view of two retainers 700 mounted within the same mounting hole of a mounting surface. Retainers 700 have the latching mechanisms of FIGS. 6(a)–(c).

When the mounting hole is a square with two horizontal sides and two vertical sides, a first retainer, such as that shown in either FIG. 2 or FIG. 7, can be mounted in either a horizontal or a vertical orientation, where a horizontal orientation means that the large prongs engage the two horizontal sides of the square mounting hole and a vertical orientation means that the large prongs engage the two vertical sides of the square mounting hole. According to the latching-mechanism designs shown in FIGS. 5(a)–(c) and FIGS. 6(a)–(c), when two retainers are mounted back to back, they must be mounted in the same orientation, either horizontal or vertical, but not both. In these cases, mounting the first retainer determines the orientation of the second retainer.

Figure 8A:
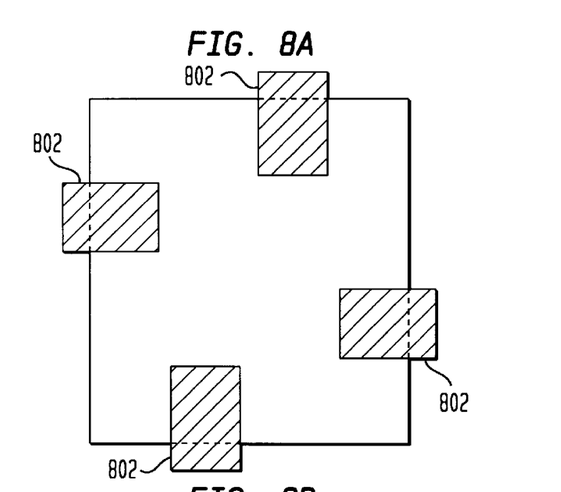
FIGS. 8(a)–(c) show end views of a prong arrangement for retainers, according to another embodiment of the present invention.
Figure 8B:
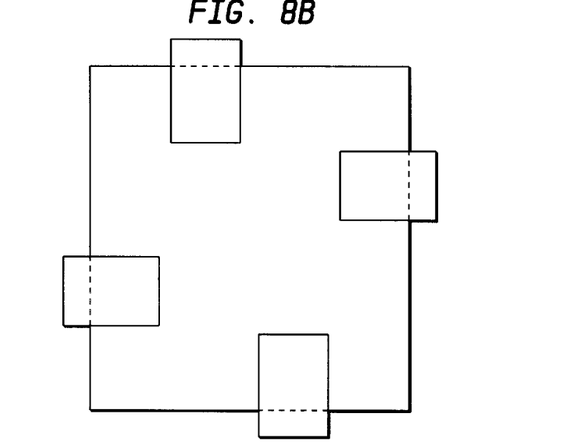
Figure 8C:
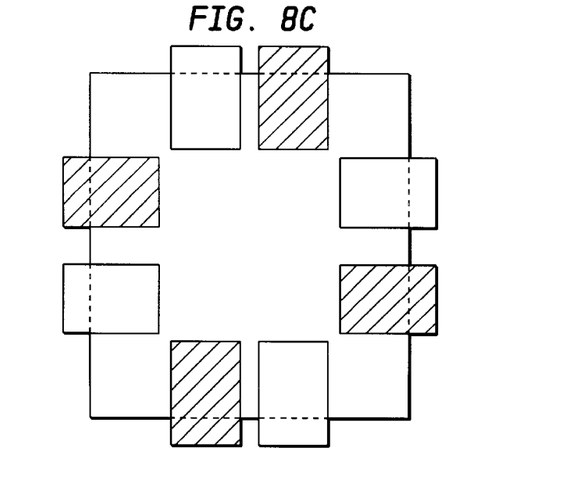

FIGS. 8(a)–(c) show end views of a prong arrangement for retainers, according to another embodiment of the present invention, in which two retainers can be mounted back to back within the same mounting hole with either parallel orientation (i.e., both in the same orientation) or perpendicular orientation (i.e., one horizontal and the other vertical). These mounting options are provided by the use of four small mounting prongs 802, which do not limit the relative orientation of two retainers when mounted back to back.

Figure 9A:
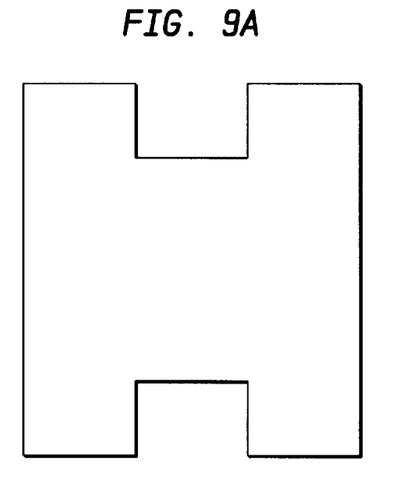
FIGS. 9(a)–(b) show alternative designs for mounting holes.
Figure 9B:
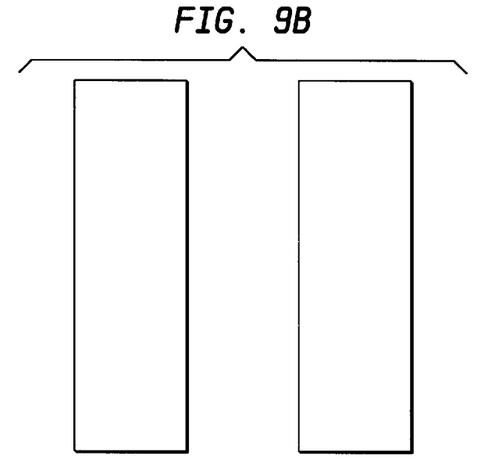

Depending on the application, it may be desirable to limit the orientation at which the retainers can be mounted. For example, it may be desirable to force the user to mount both retainers in the vertical orientation. This can be achieved by designing the shape of the mounting hole to limit the mounting options. For example, if the mounting hole is a non-square rectangle, the orientation of the retainer may be limited to only one of horizontal or vertical. Similarly, the mounting hole may have a non-regular shape, such as that shown in FIG. 9(a), or have two or more openings, such as that shown in FIG. 9(b), both of which determine the orientation of any retainers mounted therein.

In the embodiments of FIGS. 2–4 and 7, the invention is shown in the context of a retainer. Those skilled in the art will understand that the latching mechanism of the present invention can be used to mount devices other than retainers. In general, the present invention can be applied to any device that is mounted within a mounting hole in a mounting surface.

In the embodiments of FIGS. 5, 6, and 8, the invention is shown in the context of mounting devices within a rectangular mounting hole. Those skilled in the art will understand that the latching mechanism of the present invention can be designed to mounted devices within mounting holes having shapes other than rectangles.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A device comprising a latching mechanism adapted to mount the device within a mounting hole in a mounting surface, wherein the latching mechanism comprises two or more mounting prongs positioned to form gaps between the mounting prongs, such that two such devices are adapted to be mounted back to back on opposite sides of the mounting hole with the prongs of each device fitting within the gaps of the other device.

2. The invention of claim 1, wherein the device is a retainer, comprising the latching mechanism and a loop arrangement for retaining one or more wires, fibers, and/or cables, wherein two such retainers are adapted to be mounted back to back within a single mounting hole to provide retention capabilities on both sides of the mounting surface.

3. The invention of claim 1, wherein a first device, when mounted within the mounting hole on a first side of the mounting surface, prevents access from the first side to a second device mounted within the mounting hole on a second side of the mounting surface.

4. The invention of claim 1, wherein the device is adapted to be mounted such that two such devices can only be mounted in a parallel orientation within the single mounting hole.

5. The invention of claim 4, wherein the latching mechanism comprises two large mounting prongs.

6. The invention of claim 5, wherein the latching mechanism further comprises two small mounting prongs.

7. The invention of claim 1, wherein the device is adapted to be mounted such that two such devices can be mounted in a parallel orientation or in a perpendicular orientation within the single mounting hole.

8. The invention of claim 7, wherein the latching mechanism comprises two or more small mounting prongs.

9. The invention of claim 1, wherein the latching mechanism is adapted to be inserted within a rectangular mounting hole and the latching mechanism, when mounted in the rectangular mounting hole, comprises two mounting prongs positioned on opposite halves of opposing sides of the rectangular mounting hole.

10. The invention of claim 1, wherein the latching mechanism is adapted to be inserted within a mounting hole having a shape that determines mounting orientations for the device.

11. The invention of claim 10, wherein the shape of the mounting hole limits the mounting orientation for the device to one of horizontal and vertical.

\* \* \* \* \*